United States Patent
Ginzburg

(10) Patent No.: US 7,633,891 B2
(45) Date of Patent: Dec. 15, 2009

(54) METHOD AND APPARATUS FOR IMPLEMENTING BLOCK ACKNOWLEDGEMENT IN A WIRELESS NETWORK

(75) Inventor: Boris Ginzburg, Haifa (IL)

(73) Assignee: Intel Corporation, Santa Clara, CA (US)

( * ) Notice: Subject to any disclaimer, the term of this patent is extended or adjusted under 35 U.S.C. 154(b) by 732 days.

(21) Appl. No.: 11/074,987

(22) Filed: Mar. 8, 2005

(65) Prior Publication Data

US 2006/0203752 A1    Sep. 14, 2006

(51) Int. Cl.
*H04B 7/005* (2006.01)
(52) U.S. Cl. .................. 370/278; 370/229; 370/412
(58) Field of Classification Search .......... 370/229, 370/230, 278, 428; 714/748, 749
See application file for complete search history.

(56) References Cited

U.S. PATENT DOCUMENTS

| | | | | |
|---|---|---|---|---|
| 6,757,245 | B1* | 6/2004 | Kuusinen et al. | 370/230 |
| 2003/0115338 | A1* | 6/2003 | Jayam et al. | 709/228 |
| 2006/0034277 | A1* | 2/2006 | Jang et al. | 370/389 |
| 2006/0104300 | A1* | 5/2006 | Ho | 370/428 |
| 2006/0107166 | A1* | 5/2006 | Nanda | 714/748 |
| 2006/0239213 | A1* | 10/2006 | Frederiks et al. | 370/278 |

* cited by examiner

*Primary Examiner*—Albert T Chou
(74) *Attorney, Agent, or Firm*—The Law Offices of John C. Scott, LLC; John C. Scott

(57) ABSTRACT

The size of a block acknowledgement (BA) window used during a BA transaction is varied during the transaction based on one or more parameters that are related to a present channel condition between an originator device and a recipient device.

25 Claims, 4 Drawing Sheets

METHOD AND APPARATUS FOR IMPLEMENTING BLOCK ACKNOWLEDGEMENT IN A WIRELESS NETWORK

TECHNICAL FIELD

The invention relates generally to wireless communication and, more particularly, to wireless networking.

BACKGROUND OF THE INVENTION

In next generation wireless networks, a block acknowledgement (BA) mechanism may be employed in which a single acknowledgement frame is used to acknowledge the successful receipt of a number of data frames. During a BA transaction, a first network device (called the originator) may transmit data frames to a second network device (called the recipient) in a series of BA windows. Within each BA window, the originator may transmit a number of consecutive data frames to the recipient. After the frames have been transmitted, the originator may transmit a BA request to the recipient requesting that the recipient acknowledge receipt of the transmitted data frames. The recipient may then respond by transmitting a BA response to the originator that indicates which of the originally transmitted data frames were successfully received and which were not. If one or more of the transmitted data frames were not successfully received, the originator may retransmit the frames in a future BA window.

When the recipient receives data frames from the originator, it may temporarily store the frames within a receive buffer according to the sequence numbers associated with the frames. The data frames may then be read in sequence from the receive buffer. If the receive buffer becomes full, the transfer of data frames from the originator to the recipient will stall. This will typically result in reduced throughput and link utilization in the wireless network. There is a need for techniques and structures that are capable of enhancing throughput in a wireless network link during block acknowledgement bursting operations.

DETAILED DESCRIPTION

Figure 1:
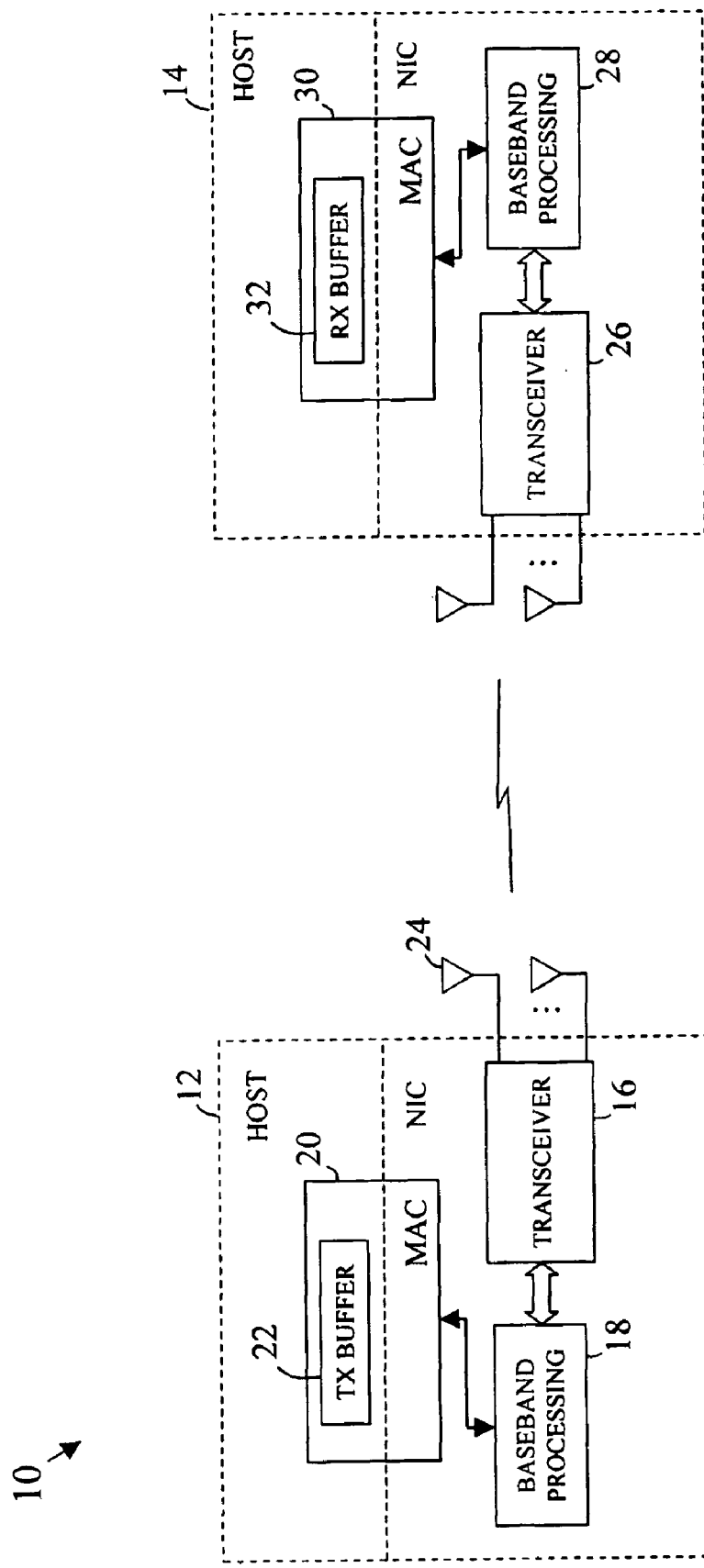
FIG. 1 is a block diagram illustrating an example wireless network arrangement that may utilize BA bursting techniques in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example wireless network arrangement 10 that may utilize BA bursting techniques in accordance with an embodiment of the present invention. As illustrated, a first wireless network device 12 is communicating with a second wireless network device 14 via a wireless network link. The first and second wireless devices 12, 14 may be two wireless client devices operating in an ad hoc mode, one wireless client device and one wireless access point (AP) operating in an infrastructure mode, two wireless APs, or some other configuration of devices. When the first wireless device 12 wishes to transmit user data to the second wireless device 14 using block acknowledgement (BA) techniques, the first wireless device 12 may initiate a BA transaction with the second wireless device 14. This will typically involve the use of a handshaking protocol between the two devices. The first wireless device 12 may be referred to as the "originator" of the BA transaction and the second wireless device 14 may be referred to as the "recipient." During the BA transaction, the originator may transmit data frames (e.g., MAC protocol data units (MPDUs), etc.) to the recipient in a series of consecutive BA windows. Within each BA window, the originator will transmit a series of data frames followed by a BA request. The recipient may then respond to the BA request with a BA response. The various frames of each BA window will typically be separated from one another by a short time period (e.g., a short interframe space (SIFS) in an IEEE 802.11 based network, etc.). The BA request will request an acknowledgement for each of the data frames transmitted to the recipient within the BA window. The BA response will then indicate, for each identified data frame, whether the frame was successfully received or not.

As illustrated in FIG. 1, the first wireless device 12 may include: a wireless transceiver 16, a baseband processing subsystem 18, and a medium access control (MAC) subsystem 20. The wireless transceiver 16 is operative for supporting wireless communication with one or more remote wireless entities. The baseband processing subsystem 18 is operative for performing baseband processing of signals received by, and to be transmitted from, the wireless transceiver 16. The MAC subsystem 20 is responsible for control functions related to creating, transmitting, receiving and maintaining the integrity of frames according to the rules of a corresponding wireless standard, including the Block Acknowledgement rules. In the illustrated embodiment, the first wireless device 12 includes a host device having a network interface card (NIC) (or other network interface structure) installed therein. The baseband processing subsystem 18 and the wireless transceiver 16 are located within the NIC. The MAC subsystem 20 is divided between the host device and the NIC. It should be appreciated that many alternative arrangements may alternatively be used (e.g., all subsystems may be integrated within a host without a separable NIC, the baseband processing subsystem 18 and the MAC subsystem 20 may both be located on a common card or on a common chip, etc.).

As shown in FIG. 1, the MAC subsystem 20 may include a transmit buffer 22 for use during transmit operations when the first wireless device 12 is acting as, for example, the originator of a BA transaction. As will be discussed in greater detail, the transmit buffer 22 may be loaded with one or more BA frame sequences during a BA transaction which may then be delivered to the transceiver 16 for transmission into the wireless channel. In at least one embodiment, the transmit buffer 22 resides in the host memory. The MAC subsystem 20 may use one or more digital processors such as, for example, a general purpose microprocessor, a reduced instruction set computer (RISC), a complex instruction set computer (CISC), a field programmable gate array (FPGA), an application specific integrated circuit (ASIC), and/or others. Other digital circuitry and/or logic may also, or alternatively, be present within the MAC subsystem 20. As used herein, the term "logic" may include software, hardware, and/or a combination of software and hardware.

The baseband processing subsystem 18 may include one or more programmable/reconfigurable digital processing devices such as, for example, a digital signal processor (DSP). As shown, the wireless transceiver 16 may be coupled to one or more antennas to facilitate the transmission and reception of wireless signals. Any type of antenna(s) may be used including, for example, a dipole, a patch, a helical antenna, and/or others.

The second wireless device 14 may also include a wireless transceiver 26, a baseband processing subsystem 28, and a MAC subsystem 30 which operate in a similar manner to those of the first wireless device 12. As shown, the MAC subsystem 30 of the second wireless device 14 may include a receive buffer 32 for use during receive operations when the second wireless device 14 is acting as, for example, the recipient device in a BA transaction. When the second wireless device 14 is receiving a series of data frames from the first wireless device 12 during a BA transaction, the data frames may be temporarily stored within the receive buffer 32. The data frames may be stored sequentially in the receive buffer 32 based on the sequence numbers of the frames. The data frames may thereafter be read out of the receive buffer 32 in sequential order, thus releasing corresponding storage locations within the buffer 32. If one or more of the data frames was not successfully received by the second wireless device 14, then the data within the corresponding storage location may not be read out. If the buffer thereafter fills up before the subject frame is retransmitted and successfully received, then no further data frames may be delivered to the recipient and the BA transaction stalls. This can seriously degrade throughput within the network. In one aspect of the present invention, techniques and structures are provided for efficiently managing operation during BA transactions to enhance throughput within the corresponding network link.

Figure 2:
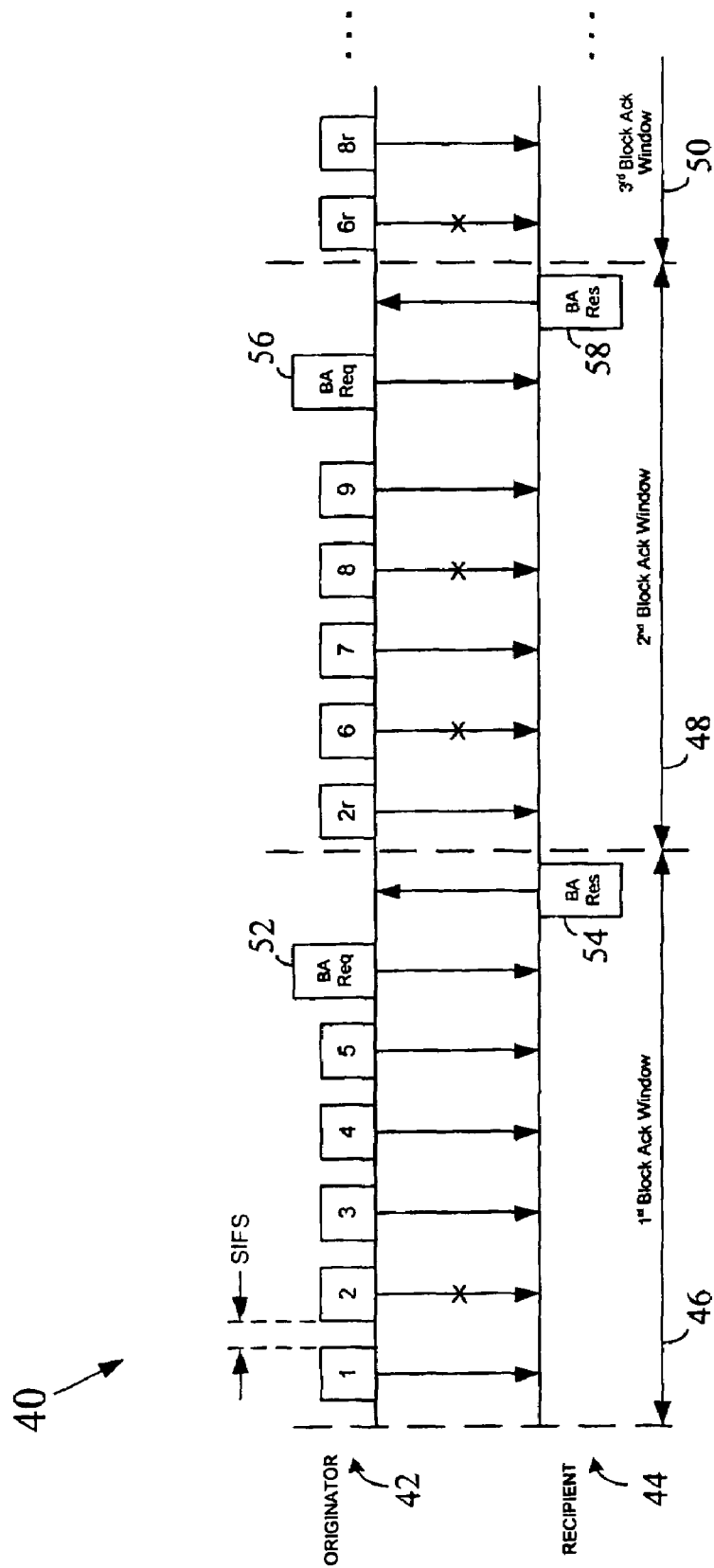
FIG. 2 is a timing diagram illustrating an example BA transaction that may occur in a wireless network.

FIG. 2 is a timing diagram illustrating an example BA transaction 40 that may occur in a wireless network. The upper portion 42 of the diagram represents the transmissions of the originator device during the BA transaction 40. The lower portion 44 represents the transmissions of the recipient device. The vertical arrows indicate the direction of the frame flow. The BA transaction 40 may be established by performing a handshaking exchange (not shown) between the originator and the recipient before any data is transferred. As illustrated in FIG. 2, the BA transaction 40 is made up of a series of BA windows 46, 48, 50, etc. Within each window, the originator may transmit a plurality of data frames followed by a BA request frame. In response to the BA request frame, the recipient may transmit a BA response frame indicating which of the transmitted data frames were successfully received and which were not. For example, within first BA window 46, the originator transmits data frames 1, 2, 3, 4, and 5 followed by BA request frame 52. The recipient then responds by transmitting BA response frame 54.

In FIG. 2, an unsuccessfully received data frame is indicated by an X through a corresponding arrow in the diagram. Thus, in the first BA window 46, data frame 2 was not successfully received by the recipient. This information would be communicated to the originator in the corresponding BA response frame 54. After the originator processes the BA response frame 54 and determines that data frame 2 was not successfully received by the recipient, the originator arranges for data frame 2 to be re-transmitted to the recipient. As illustrated in FIG. 2, this re-transmission may take place at the very beginning of the second BA window 48. Thus, in the second BA window 48, the originator transmits data frames 2r, 6, 7, 8, and 9 followed by BA request frame 56 (the r in 2r being indicative of a retransmission). The recipient then responds by transmitting BA response frame 58 to the originator. This process may then continue in the subsequent BA windows within the BA transaction 40.

As described above, if the receive buffer within the recipient device becomes full during a BA transaction, transmissions from the originator to the recipient will be suspended and throughput will suffer. Typically, for a given receive buffer size, the larger the BA window size, the higher the probability that the receive buffer will become full during a BA transaction. However, a smaller BA window size may not make efficient use of the available receive buffer space, which may also have a negative impact on performance. The condition of the channel between the originator and the recipient will also have a significant effect on the effectiveness of the BA mechanism being used. For example, if the packet error rate (PER) of the channel is high, then a higher number of data frames will be unsuccessfully received by the recipient and the buffer will be more likely to fill up. In one aspect of the present invention, the BA window size that is used during a BA transaction may adapt to a changing channel condition during the BA transaction in a manner that enhances overall throughput in the corresponding wireless network channel.

Figure 3:
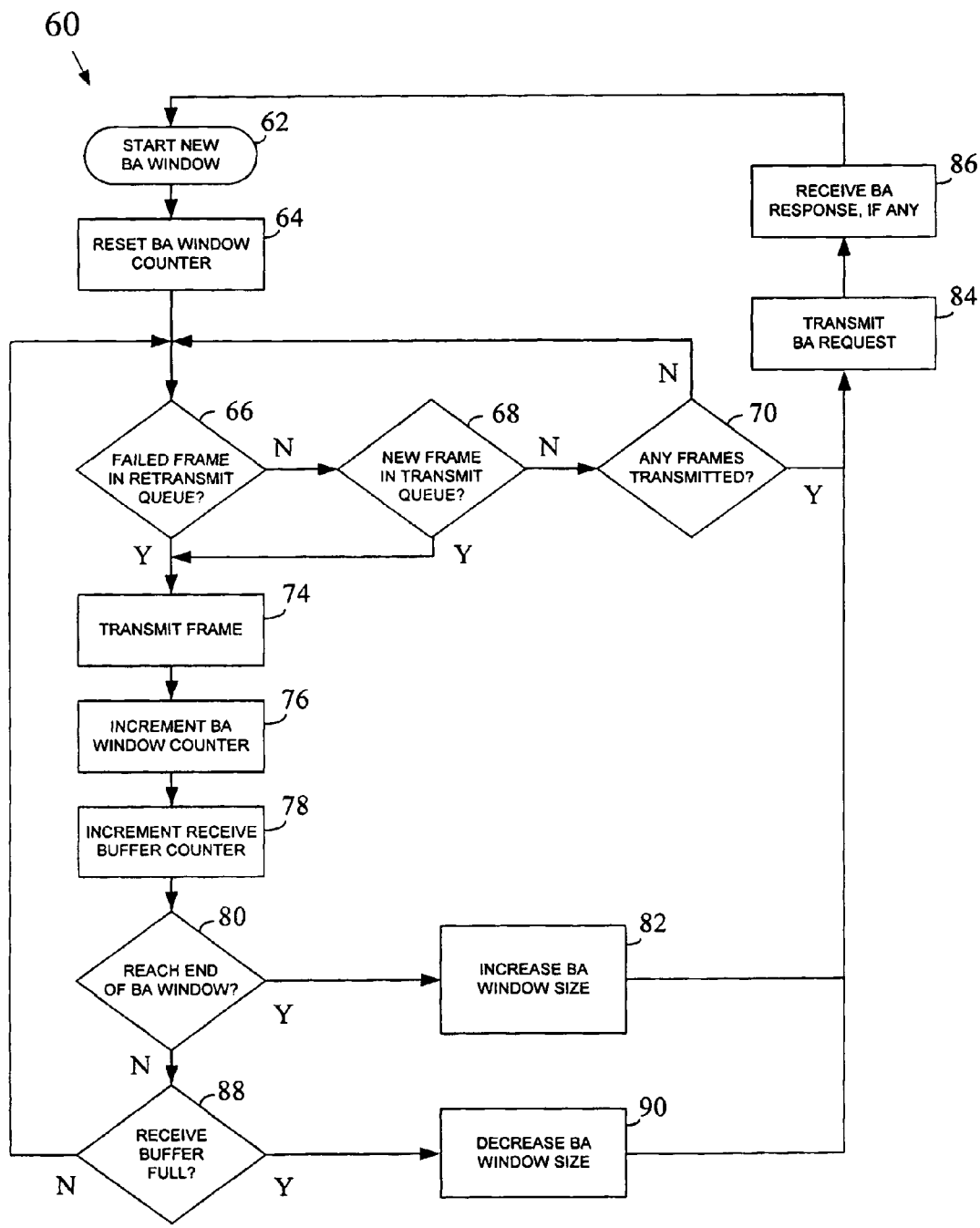
FIG. 3 is a flowchart illustrating an example method for use during a BA transaction in accordance with an embodiment of the present invention.

FIG. 3 is a flowchart illustrating an example method 60 for use during a BA transaction in accordance with an embodiment of the present invention. The method 60 may be implemented, for example, in connection with a wireless network device that is acting as an originator during the BA transaction (e.g., within a digital subsystem of the device, etc.). First, a new BA window (e.g., BA window 46 in FIG. 2) is started (block 62). A BA window counter is then reset to zero or some other initial value (block 64). The BA window counter keeps track of the number of data frames that have been transmitted within a current BA window. In the discussion that follows, the symbol i will be used to represent the present BA window counter value. A retransmit queue is then checked to determine whether there is a failed data frame waiting to be retransmitted (block 66). When the originator receives a BA response that indicates that a previously transmitted data frame was not successfully received by the recipient, the originator may place the failed frame at the end of the retransmit queue. If multiple failed frames are identified, the frames may be placed in the retransmit queue in the order that they were originally transmitted. If there is a failed data frame within the retransmit queue, the data frame is transmitted (block 74). If there are no failed data frames within the retransmit queue, it is next determined whether there is a new data frame waiting to be transmitted within a transmit queue (block 68). If there is a new data frame within the transmit queue, the data frame is transmitted (block 74). If not, it is next determined whether any frames have already been transmitted within the present BA window (block 70). If at least one data frame has already been transmitted within the window (i.e., i>0), then a BA request is transmitted a SIFS period after the end of the most recently transmitted data frame (block 84). A BA response (if any) may then be received from the recipient (block 86), after which a new BA window may be initiated (block 62). If no data frames have yet been transmitted within the BA window in block 70, the method 60 returns to block 66 and it is again determined whether there is a failed data frame waiting in the retransmit queue to be retransmitted. After a timeout period, if there are no data frames to be transmitted or retransmitted, then a BA request will be transmitted (block 84).

In an alternative approach, instead of using separate retransmit and transmit queues, a single queue may be used that includes both failed and new data frames. When a transmitted data frame is identified in a BA response frame as being a failed data frame, the data frame may be placed at the beginning of the single queue so that it is transmitted before any new frames in the queue. When a transmitted data frame is identified in a BA response frame as being successfully received by the recipient device, the data frame may be removed from the single queue after which new frames may be added to it.

After a data frame has been transmitted in block 74, the BA window counter is incremented by one (block 76). A receive buffer counter within the originator is then also incremented by one (block 78). The receive buffer counter is operative for tracking the number of locations in the receive buffer of the recipient device that are currently occupied. During a handshaking procedure at the beginning of a BA transaction, the size of the receive buffer of the recipient device may be determined by the originator. Also during the handshaking procedure, the value of the receive buffer counter may be initialized to zero.

At this point, it may be determined whether the end of the present BA window has been reached (e.g., does i=W, where W is the current BA window size measured as a total number of data frames within a full BA window) (block 80). If the end of the BA window has been reached, the BA window size may be increased (block 82). The BA window size may be increased in any of a variety of ways. For example, in one approach, the BA window size may simply be incremented by one (e.g., $W_{new}$=W+1) or some other predetermined value. In another possible approach, the number of empty slots in the receive buffer (k) may be used to adjust the BA window size. The number of empty slots in the receive buffer may be calculated as:

$$k=S-j$$

where k is the number of empty slots, S is the total number of slots in the receive buffer, and j is the current value of the receive buffer counter. Using k, the BA window size may be adjusted as follows:

$$W_{new}=W+\beta \times k$$

where β is a coefficient that defines how fast W reacts to an improvement in channel conditions. Other techniques for increasing the BA window size may alternatively be used. After the BA window size has been increased, a BA request may be transmitted (e.g., a SIFS period after the end of the most recently transmitted data frame) (block 84). A BA response (if any) may then be received from the recipient (block 86), after which a new BA window may be initiated (block 62).

If the end of the BA window has not been reached in block 80, then it may next be determined whether the receive buffer is currently full (block 88). In one approach, the status of the receive buffer may be determined by comparing the current value of the receive buffer counter j to the number of slots S in the receive buffer (i.e., does i==S?). If the receive buffer is full, then the BA window size may be decreased (block 90). The BA window size may be decreased in any of a variety of ways. For example, in one approach, the BA window size may simply be decremented by one (e.g., W=W−1) or some other predetermined value. In another possible approach, the BA window size is adjusted based on BA window under-use. In at least one embodiment, the BA window under-use may be computed as follows:

$$e=W-i$$

where e is the under-use, W is the current BA window size measured as a total number of data frames within a full BA window, and i is the present value of the BA window counter. The BA window size may then be decreased as follows:

$$W_{new}=W-\gamma \times e$$

where γ is a coefficient that defines how fast W reacts to a worsening of the channel conditions. Other techniques for decreasing the BA window size may alternatively be used. After the BA window size has been decreased, a BA request may be transmitted (block 84). A BA response (if any) may then be received from the recipient (block 86), after which a new BA window may be initiated (block 62). If the receive buffer is not full in block 88, then the method 60 may return to block 66 where it is again determined whether there is a failed data frame waiting in the retransmit queue to be retransmitted.

Figure 4:
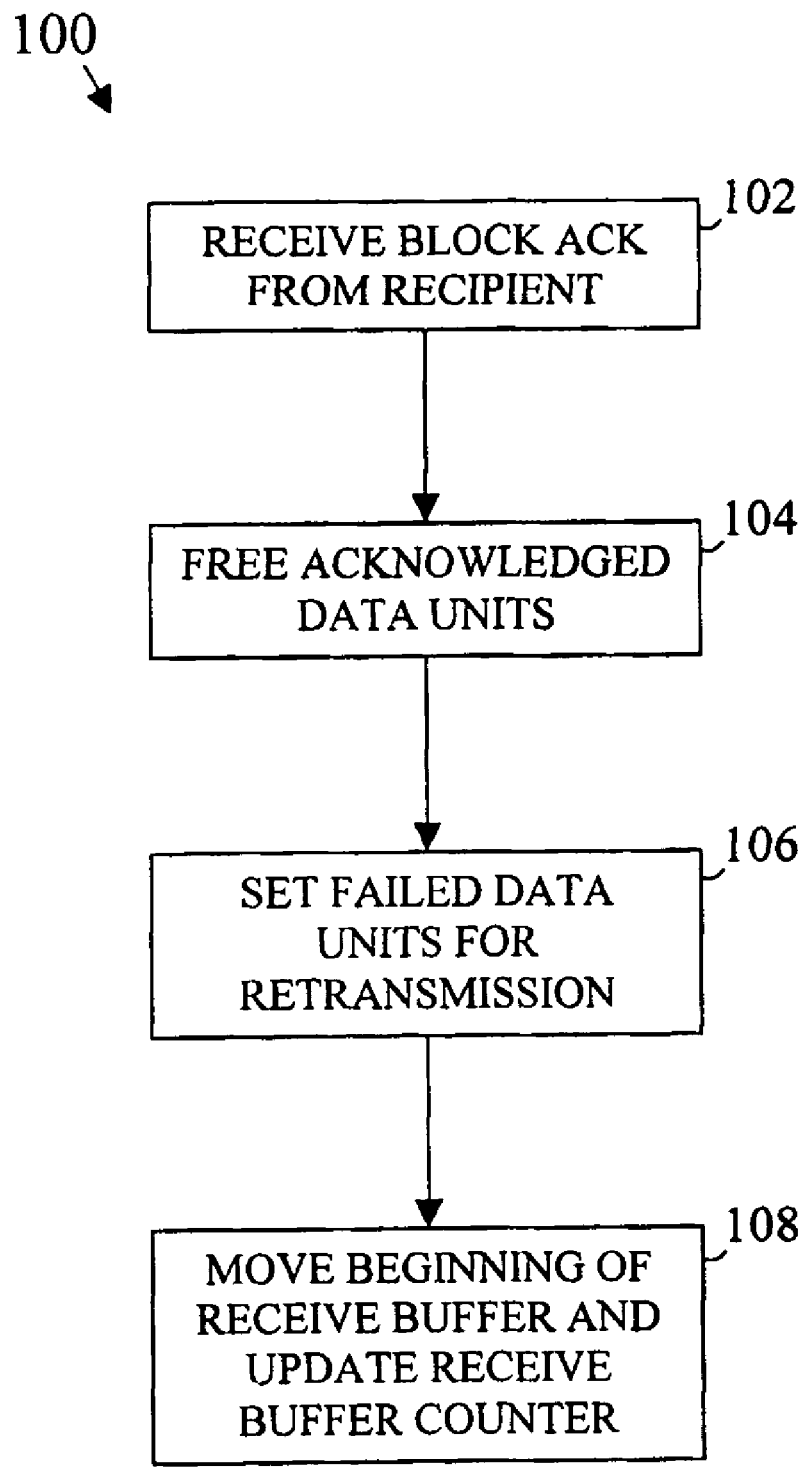
FIG. 4 is a block diagram illustrating another example method for use during a BA transaction in accordance with an embodiment of the present invention.

FIG. 4 is a block diagram illustrating another example method 100 for use during a BA transaction in accordance with an -embodiment of the present invention. The method 100 may be implemented in connection with, for example, a wireless network device that is acting as an originator device in a BA transaction (e.g., within a digital subsystem of the device, etc.). When an originator device receives a BA response from a recipient device in response to a BA request, the originator must adjust some parameters within the originator based on the content of the BA response. The method 100 represents one technique for making these adjustments. As illustrated, a BA response is first received from a recipient device (block 102). The BA response is then read to determine which data frames were successfully received by the recipient and which were not. The data frames that were successfully received (i.e., the acknowledged frames) do not need to be re-transmitted and are thus "freed" within the originator (block 104). That is, the memory location storing the data frames may be freed to accept new data frames. In addition, the transmit statistics may be updated and notification may be sent to the operating system. The data frames that were not successfully received are then set for re-transmission (block 106). This may include, for example, adding the failed data frames to the end of a retransmit queue (or, if a single transmit/retransmit queue is being used, toward the beginning of the queue after any retransmit frames already in the queue). The beginning of the recipient receive buffer that is maintained within the originator is then moved based on the content of the response frame. The receive buffer counter may also be updated at this point (block 108). The beginning of the receive buffer may be moved, for example, to the earliest buffer location that includes a failed data frame (or to some other location). The receive buffer counter may then be updated by, for example, subtracting the corresponding number of data frames from the current receive buffer counter value. The method 100 may be performed, for example, every time that a BA response is received by an originator device.

The techniques and structures of the present invention may be implemented in any of a variety of different forms. For example, features of the invention may be embodied within computers having wireless networking capability, personal digital assistants and other devices having wireless networking capability, cellular telephones and other handheld wireless communicators, pagers, satellite communicators, network interface cards (NICs) and other network interface structures, integrated circuits, as instructions and/or data structures stored on machine readable media, and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A machine implemented method for use during a block acknowledgement (BA) transaction in a wireless network, comprising:
    transmitting data frames to a wireless recipient device during a current BA window of the BA transaction, said current BA window having a first BA window size measured as a total number of data frames to be transmitted;
    decreasing said first BA window size for use during a subsequent BA window of the BA transaction when a receive buffer of said wireless recipient device becomes full before said total number of data frames of said current BA window have been transmitted; and
    increasing said first BA window size for use during said subsequent BA window of the BA transaction when said receive buffer of said wireless recipient device does not become full before said total number of data frames of said current BA window have been transmitted.

2. The method of claim 1, wherein:
    decreasing said first BA window size includes decrementing said first BA window size by a predetermined value.

3. The method of claim 1, wherein:
    decreasing said first BA window size includes decreasing said first BA window size based on BA window under-use.

4. The method of claim 3, wherein:
    decreasing said BA window size includes decreasing said BA window size as follows:

$$W_{new} = W - \gamma \times e$$

where W is said first BA window size, $W_{new}$ is the new BA window size, e is said BA window under-use, and $\gamma$ is a coefficient that defines how fast said BA window size changes.

5. The method of claim 1, wherein:
    increasing said first BA window size includes incrementing said first BA window size by a predetermined value.

6. The method of claim 1, wherein:
    increasing said first BA window size includes increasing said first BA window size based on a number of empty slots in a receive buffer of said wireless recipient device when said end of said current BA window is reached.

7. The method of claim 1, wherein:
    increasing said first BA window size includes increasing said first BA window size as follows:

$$W_{new} = W + \beta \times k$$

where W is said first BA window, $W_{new}$ is the new BA window size, k is said number of empty slots in said receive buffer of said wireless recipient device, and $\beta$ is a coefficient that defines how fast said BA window size changes.

8. The method of claim 1, wherein:
    transmitting data frames includes first transmitting data frames within a retransmit queue, if any, and then transmitting data frames within a transmit queue, wherein said data frames within said retransmit queue are data frames that were previously transmitted but unsuccessfully received by said wireless recipient device.

9. The method of claim 1, further comprising:
    resetting a BA window counter at the beginning of the BA transaction; and
    incrementing said BA window counter after each data frame is transmitted during said current BA window.

10. The method of claim 1, further comprising:
    incrementing a receive buffer counter after each data frame is transmitted during said current BA window, said receive buffer counter to track a current status of a receive buffer within said wireless recipient device.

11. An apparatus comprising:
    a wireless transceiver to support wireless communication with a remote wireless entity; and
    a digital subsystem, coupled to said wireless transceiver, to initiate a block acknowledgement (BA) transaction between said apparatus and a wireless recipient device, to cause data frames to be transmitted to said wireless recipient device during said BA transaction in a series of BA windows, and to vary a BA window size that is used during said BA transaction, said BA window size being measured as a total number of data frames to be transmitted during a BA window of the BA transaction, wherein said digital subsystem is to decrease a BA window size for use during a subsequent BA window of the BA transaction when a receive buffer of said wireless recipient device becomes full before said total number of data frames of a current BA window have been transmitted and increase said BA window size for use during said subsequent BA window of the BA transaction when said receive buffer of said wireless recipient device does not become full before said total number of data frames of said current BA window have been transmitted.

12. The apparatus of claim 11, wherein:
said digital subsystem is to decrease said BA window size by decrementing said BA window size by a predetermined value.

13. The apparatus of claim 11, wherein:
said digital subsystem is to decrease said BA window size based on BA window under-use.

14. The apparatus of claim 11, wherein:
said digital subsystem is to increase said BA window size by incrementing said BA window size by a predetermined value.

15. The apparatus of claim 11, wherein:
said digital subsystem is to increase said BA window size based on a number of empty slots in a receive buffer of said wireless recipient device when said end of said current BA window is reached.

16. The apparatus of claim 11, wherein:
said digital subsystem causes data frames to be transmitted within a BA window by first transmitting data frames within a retransmit queue, if any, and then transmitting data frames within a transmit queue, wherein said data frames within said retransmit queue are data frames that were previously transmitted but unsuccessfully received by said wireless recipient device.

17. The apparatus of claim 11, wherein:
said digital subsystem is to reset a BA window counter at the beginning of each BA window of said BA transaction and increment said BA window counter after each data frame is transmitted during a BA window.

18. The apparatus of claim 11, wherein:
said digital subsystem is to increment a receive buffer counter after each data frame is transmitted during a BA window, said receive buffer counter to track a current status of a receive buffer within said wireless recipient device.

19. A system comprising:
at least one dipole antenna;
a wireless transceiver, coupled to said at least one dipole antenna, to support wireless communication with a remote wireless entity; and
a digital subsystem, coupled to said wireless transceiver, to initiate a block acknowledgement (BA) transaction between said system and a wireless recipient device, to cause data frames to be transmitted to said wireless recipient device during said BA transaction in a series of BA windows, and to vary a BA window size that is used during said BA transaction, said BA window size being measured as a total number of data frames to be transmitted during a BA window of the BA transaction, wherein said digital subsystem is to decrease a BA window size for use during a subsequent BA window of the BA transaction when a receive buffer of said wireless recipient device becomes full before said total number of data frames of a current BA window have been transmitted and increase said BA window size for use during said subsequent BA window of the BA transaction when said receive buffer of said wireless recipient device does not become full before said total number of data frames of said current BA window have been transmitted.

20. The system of claim 19, wherein:
operation to decrease said BA window size includes operation to decrease said BA window size based on BA window under-use.

21. The system of claim 19, wherein:
operation to increase said BA window size includes operation to increase said BA window size based on a number of empty slots in a receive buffer of said wireless recipient device when said end of said current BA window is reached.

22. An article comprising a machine readable storage medium having instructions stored thereon that, when executed by a computing platform, operate to:
initiate a block acknowledgement (BA) transaction between a wireless originator device and a wireless recipient device;
cause data frames to be transmitted to said wireless recipient device during said BA transaction in a series of BA windows; and
vary a BA window size used during said BA transaction, said BA window size being measured as a total number of data frames to be transmitted during a BA window of the BA transaction, wherein operation to vary said BA window size includes operation to decrease a BA window size for use during a subsequent BA window of the BA transaction when a receive buffer of said wireless recipient device becomes full before said total number of data frames of a current BA window have been transmitted and increase said BA window size for use during said subsequent BA window of the BA transaction when said receive buffer of said wireless recipient device does not become full before said total number of data frames of said current BA window have been transmitted.

23. The article of claim 22, wherein:
operation to decrease said BA window size includes operation to decrease said BA window size based on BA window under-use.

24. The article of claim 22, wherein:
operation to increase said BA window size includes operation to increase said BA window size based on a number of empty slots in a receive buffer of said wireless recipient device when said end of said current BA window is reached.

25. The article of claim 22, wherein said instructions further operate to:
reset a BA window counter at the beginning of each BA window of said BA transaction and increment said BA window counter after each data frame is transmitted during a BA window.

* * * * *

UNITED STATES PATENT AND TRADEMARK OFFICE
CERTIFICATE OF CORRECTION

PATENT NO.        : 7,633,891 B2                                        Page 1 of 1
APPLICATION NO.   : 11/074987
DATED             : December 15, 2009
INVENTOR(S)       : Boris Ginzburg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1276 days.

Signed and Sealed this

Twenty-first Day of December, 2010

David J. Kappos
*Director of the United States Patent and Trademark Office*